United States Patent [19]
Durkin et al.

[11] 3,933,623
[45] Jan. 20, 1976

[54] DESULFURIZATION PROCESS

[75] Inventors: Joseph A. Durkin, Fishkill; Jitendra A. Patel, Wappingers Falls, both of N.Y.

[73] Assignee: Texaco Inc., New York, N.Y.

[22] Filed: Aug. 9, 1974

[21] Appl. No.: 495,968

[52] U.S. Cl. ................. 208/216; 252/466; 252/470
[51] Int. Cl.² ......................................... C10G 23/02
[58] Field of Search ............ 208/216, 217, 244, 295

[56] References Cited
UNITED STATES PATENTS
3,509,044  4/1970  Adams et al. ........................ 208/217

FOREIGN PATENTS OR APPLICATIONS
1,165,185  3/1964  Germany ............................ 208/216
866,560  4/1961  United Kingdom ................. 208/217

*Primary Examiner*—Delbert E. Gantz
*Assistant Examiner*—Juanita D. M. Nelson
*Attorney, Agent, or Firm*—T. H. Whaley; C. G. Ries; Robert Knox, Jr.

[57] ABSTRACT

The deactivation rate of a catalyst used for the high temperature, high space velocity desulfurization of heavy oils is reduced by the incorporation in the catalyst of a small amount of a noble metal.

12 Claims, No Drawings

DESULFURIZATION PROCESS

This invention relates to the desulfurization of petroleum fractions. More particularly, it is concerned with the catalytic hydrodesulfurization of heavy petroleum oils under conditions whereby the throughput and desulfurization efficiency of a unit may be increased and the hydrogen consumption reduced while the catalyst life is prolonged.

The catalytic desulfurization of petroleum oils has been well known in the refining industry for many years having been discussed extensively in "Petroleum Processing" November 1956, pages 116–138. The literature discloses reaction conditions, using a fixed bed of particulate catalyst, in the broad ranges of temperatures of from 400°–900°F., pressures of from 50–5000 psig, hydrogen rates of from 200–20,000 standard cubic feet per barrel (scfb) and space velocities of 0.1–20 volumes of oil per volume of catalyst per hour (v/v/hr.)

Experience has shown that in the commercial desulfurization of heavy oils such as gas oils and heavier stocks that is, oils having an initial boiling point of about 500°F. or higher, using fixed beds and conventional desulfurization catalysts, the start-of-run temperature using fresh or freshly regenerated catalyst is usually between about 625° and 650°F. and the end-of-run temperature about 750°F., a gradual increase in temperature being made to compensate for loss of activity of the catalyst throughout the onstream period. Pressures range generally between about 500 and 1,000 psig with hydrogen rates of about 500–2000 scfb. Ordinarily in conventional commercial units the space velocity is controlled to obtain the desired amount of desulfurization with 85–90 percent desulfurization being considered as the most practical from an efficiency standpoint. For the most part, conventional commercial heavy oil desulfurization units are designed to operate at a space velocity of about 1.

It has been generally accepted in the industry that hydrogen consumption is a function of the amount of desulfurization and that as the percent desulfurization increases so does the amount of hydrogen consumed. It is also a general belief in the industry that, other things being equal, a decrease in space velocity or correlatively a longer residence time is required to obtain an increase in desulfurization. It has also been generally accepted that high temperatures result in shortened catalyst life due to loss of activity on the part of the catalyst through deposition of carbon and in the case of residue-containing charge stocks, metal-containing compounds on the surface of the catalyst particles.

For ecological reasons, it has become necessary to refine more and more petroleum fractions to reduce the sulfur content thereof thus making desulfurization costs enormous, not only in the amount of new processing equipment that must be built but also in the costs of processing the various petroleum fractions such as the energy consumed in heating and pressurizing the petroleum fraction and in the cost of hydrogen consumed. Process improvements leading to a reduction in hydrogen consumption of 100 scfb or an increase in desulfurization from 90 to 95 percent would result in a great economic improvement over current operations. It would also be a distinct improvement in the efficiency of a hydrodesulfurization unit if the catalyst deactivation rate could be reduced thereby prolonging the onstream periods and reducing the overall down-time for catalyst regeneration.

According to our invention, the efficiency of a desulfurization unit is improved by contacting a sulfur-containing petroleum oil having an initial boiling point of at least about 500°F. with added hydrogen at a temperature between 750° and 850°F., a pressure between about 300 and 3000 psig and a space velocity between 3 and 10 preferably from 4 to 8 v/v/hr. in the presence of a hydrogenation catalyst comprising a Group VI metal or compound thereof and an iron group metal or compound thereof on a refractory inorganic oxide support and containing from about 0.1 to 5 percent by weight noble metal based on the catalyst composite.

The feed used in the process of our invention is a heavy petroleum oil fraction having an initial boiling point of at least about 500°F. Non-limiting examples of such feeds are atmospheric gas oils, vacuum gas oils, atmospheric residua, vacuum residua, heavy coker distillates, coal tar distillates and gas oils obtained from shale, tar sand and the like. Generally, they contain from about 0.5 to 5.0 weight percent sulfur.

The hydrogen used in our process may be obtained from any suitable source such as reformer by-product hydrogen, electrolytic hydrogen or hydrogen produced by the partial oxidation of carbonaceous or hydrocarbonaceous materials followed by shift conversion and $CO_2$ removal. The hydrogen should have a purity of at least 50 percent and preferably at least 65 percent by volume, the higher the purity the greater the partial pressure of the hydrogen.

The catalyst used in the process of our invention comprises a Group VIII metal such as an iron group metal or compound thereof composited with a Group VI metal or compound thereof on a refractory inorganic oxide support. Suitable Group VIII metals are nickel and cobalt which may be used in conjunction with tungsten or molybdenum. Preferably, the metals are in the form of the oxide or sulfide. Advantageously the iron group metal is present in an amount between about 1.0 and 10 percent by weight of the catalyst composite and the Group VI metal is present in an amount between about 5 and 30 percent also based by weight on the catalyst composite. Examples of refractory inorganic oxides which may be used as a support are silica, alumina, magnesia, zirconia and the like and mixtures thereof. In a preferred embodiment the support is composed for the most part of alumina stabilized with a minor amount, e.g., up to about 5 wt. percent, silica.

The catalyst also contains as an agent for reducing the deactivation rate of the catalyst, a small amount, e.g., 0.1–5.0 preferably from 0.2–2.0 percent noble metal based on the weight of the catalyst composite. The rhodium is particularly effective in reducing the deactivation rate when the catalyst is used at conditions well above the usual commercial conditions, e.g., high temperatures such as 800°–850°F. and high space velocities such as 4–8 v/v/hr.

Neither the catalyst nor its preparation form any part of our invention. The catalyst may be prepared by conventional means such as those disclosed in U.S. Pat. No. 2,437,533 issued Mar. 9, 1948. The catalyst may be prepared by forming the support which, in a preferred embodiment, is alumina containing a small amount of silica. The support may then be impregnated with the desired metals by use of a solution of a water-soluble compound of the metal. For example, water solutions of ammonium molybdate, cobalt nitrate, nickel nitrate, ammonium metatungstate and rhodium trichloride may be used for impregnation. After the impregnation of the metallic materials on the support, the catalyst composite is dried and then calcined for several hours in air at high temperature, e.g., 900°–1000°F.

The catalyst may be used as a slurry, a moving bed, a fixed bed or a fluidized bed. In a preferred embodiment, the catalyst is used as a fixed bed of particles which may be spheroids or cylindroids, the latter being preferred. When the catalyst is used as a fixed bed, the oil flow may be either upward or downward with concurrent hydrogen flow or the flow of oil may be downward counter to upwardly flowing hydrogen. In a preferred embodiment the hydrogen and the oil both pass downwardly through the fixed bed of catalyst particles.

In commercial installations it is customary to separate the hydrogen from the desulfurization zone effluent and recycle the separated hydrogen to the desulfurization zone. To prevent the buildup of impurities such as low molecular weight gaseous hydrocarbons, hydrogen sulfide and ammonia, a portion of the recycled hydrogen may be bled from the system and replaced with fresh hydrogen. Hydrogen may also be added to the recycle stream to replace that consumed in the desulfurization process. The ammonia and hydrogen sulfide may also be removed from the hydrogen by scrubbing with a methanolamine-water solution.

By following the procedure of our invention, that is, by carrying out the desulfurization of hydrocarbon oils having an initial boiling point of at least about 500°F. using a desulfurization catalyst containing a small amount of noble metal at unusually high temperatures and space velocities, not only is there a considerable reduction in hydrogen consumption over conventional procedures but in addition, the catalyst life is prolonged.

The following examples are submitted for illustrative purposes only and it should not be construed that the invention is restricted thereto.

EXAMPLE I

In this example the catalyst is prepared from a commercially obtainable desulfurization catalyst composed of 3 wt. percent cobalt, 12 wt. percent molybdenum, 3 wt. percent silica and the balance alumina in pellet form. The cobalt and molybdenum are present as the oxides. The catalyst has a surface area of 290 m²/g., a pore volume of 0.63 cc/g. and an average pore diameter of 82.5 A. 180 grams of the catalyst is impregnated with 1.35 grams of rhodium trichloride dissolved in 125 cc. of distilled water. After standing at room temperature with occasional mixing for 1 hour, the impregnated catalyst is dried at 250°F. for 64 hours. The impregnated catalyst and a sample of catalyst, as purchased, are calcined at 900°F. for 2 hours in a flow of air. The catalysts are then evaluated by desulfurizing a West Texas-New Mexico vacuum gas oil having an API gravity of 22° and a sulfur content of 1.85 percent by passing the charge in each of Runs A and B with hydrogen through a bed of catalyst at a temperature of 800°F., a pressure of 400 psig and a space velocity of 4 v/v/hr. Hydrogen is introduced with the charge at a rate of 1,500 scfb. recycle hydrogen and 500 scfb. fresh hydrogen. The results are tabulated below, the length of the on-stream period being reported in terms of barrels of charge per lb. of catalyst, catalyst A being the catalyst as purchased and calcined and B the catalyst containing 0.3 wt. percent rhodium.

TABLE 1

| Throughput (bbl./lb.) | A | B |
|---|---|---|
| 0.20 | 91.3 | 91.8 |
| 0.27 | 90.2 | 91.3 |
| 0.34 | 89.1 | 90.2 |
| 0.41 | 88.1 | 89.7 |
| 0.47 | 87.0 | 89.1 |
| 0.54 | 87.5 | 89.1 |
| 0.61 | 86.4 | 89.1 |
| 0.68 | 85.9 | 87.5 |
| 0.75 | 85.4 | 88.1 |
| 0.82 | 84.8 | 88.1 |
| 0.89 | 85.4 | 87.5 |
| 0.95 | 84.8 | 87.5 |
| 1.02 | 84.3 | 88.1 |
| 1.09 | 84.3 | 88.1 |
| 1.16 | 84.3 | 87.0 |
| 1.23 | 84.3 | 85.9 |
| 1.30 | 83.7 | 86.4 |
| 1.37 | 83.7 | 87.0 |
| 1.43 | 83.2 | 86.4 |
| 1.50 | 83.2 | 86.4 |
| 1.57 | 82.1 | 85.4 |
| 1.64 | 81.6 | 85.4 |

The foregoing data in which columns A and B list the percent desulfurization show that the rate of deactivation of Catalyst B is considerably lower than that of Catalyst A.

EXAMPLE II

In this example 300 grams of the commercially obtainable cobalt molybdenum catalyst pellets used in Example I is impregnated with 200 ml. of a solution of chloroplatinic acid containing 0.9g platinum. After standing for 1 hour at room temperature the catalyst is dried overnight at 250°F. Calcination is carried out in a flow of air at 900°F. The catalyst contains 0.3 wt. percent platinum.

EXAMPLE III 180 g of commercial catalyst pellets used in Example I is impregnated with a solution of 0.45 g of rhodium trichloride dissolved in 125 cc of H₂O. After standing at room temperature with occasional mixing for 1 hour, the impregnated catalyst is dried at 250°F. for 64 hours. The impregnated catalyst is calcined at 900°F. for 2 hours in a flow of air. It contains 0.1 wt. percent rhodium.

The catalysts prepared in Examples II and III above are evaluated against the unimpregnated catalyst by desulfurization of West Texas-New Mexico Sour vacuum gas oil containing 1.9 wt. percent sulfur at a temperature of 800°F., a pressure of 800 psig, a space velocity of 4 v/v/hr. in the presence of hydrogen introduced at a rate of 500 scf fresh hyrogen and 1,500 scf recycle hydrogen per barrel of feed.

The results are tabulated below, the length of the on stream period being reported in terms of barrels of charge per pound of catalyst, with the column headed Base Run listing the percent desulfurization of the unimpregnated catalyst and the columns headed II and III listing the percent desulfurization of the respective catalysts.

TABLE 2

| Throughput (bbl./lb.) | Base Run | II | III |
|---|---|---|---|
| 0.5 | 90.8 | 92.6 | — |
| 0.6 | 90.7 | 92.4 | — |
| 0.7 | 90.6 | 92.3 | — |
| 0.8 | 90.5 | 92.1 | — |

TABLE 2-continued

| Throughput (bbl./lb.) | Base Run | II | III |
|---|---|---|---|
| 0.9 | 90.4 | 92.0 | 92.4 |
| 1.0 | 90.3 | 91.9 | 92.4 |
| 1.1 | 90.2 | 91.7 | 92.3 |
| 1.2 | 90.1 | 91.6 | 92.2 |
| 1.3 | 90.0 | 91.5 | 92.2 |
| 1.4 | 89.9 | 91.4 | 92.1 |
| 1.5 | 89.8 | 91.3 | 92.1 |
| 1.6 | 89.7 | 91.1 | 92.1 |
| 1.7 | 89.6 | 91.0 | 92.0 |
| 1.8 | 89.6 | 90.9 | 92.0 |
| 1.9 | 89.5 | 90.8 | 91.9 |
| 2.0 | 89.4 | 90.7 | 91.9 |
| 2.1 | 89.3 | 90.7 | 91.9 |
| 2.2 | 89.2 | 90.6 | 91.8 |
| 2.3 | 89.2 | 90.5 | 91.8 |
| 2.4 | 89.1 | 90.4 | 91.7 |
| 2.5 | 89.0 | 90.3 | 91.7 |
| 2.6 | 89.0 | 90.3 | 91.7 |

EXAMPLE IV

In this example, 300 grams of the same commercially available desulfurization catalyst used in Example I is impregnated with an aqueous solution containing 0.6 g of $IrCl_3 \cdot 4 H_2O$ in 189 cc. of water. After standing at room temperature with occasional mixing for several hours, the impregnated catalyst is dried at 250°F. for 64 hours and then calcined at 1000°F. for 2 hours. The resulting catalyst contains 0.1 wt. percent iridium. This catalyst is evaluated against the unimpregnated catalyst by making comparative runs using as charge stock an Arabian vacuum gas oil containing 2.37 wt. percent sulfur in which the charge is passed through a bed of catalyst pellets. The reaction conditions are less severe in this example than in Examples II and III in that as in Example I the pressure here is only 400 psig. The other conditions are a temperature of 800°F., a space velocity of 4 v/v/hr. with hydrogen introduced at a rate of 2,000 scfb of which 500 scf is fresh hydrogen and 1,500 scf is recycled hydrogen. The results are tabulated below, throughput being measured in terms of barrels of charge per pound of catalyst, and the column headed "Base Run" showing the percent desulfurization using the unimpregnated catalyst and that headed "IV" showing the percent desulfurization using the catalyst containing 0.1 wt. percent iridium. It will be noted again that the deactivation rate of catalyst IV is lower than that of the unimpregnated catalyst.

For a true comparison, in each of these examples the unimpregnated catalyst is subjected to the same calcination treatment as the impregnated catalyst with which it is compared.

TABLE 3

| Throughput | Base Run | IV |
|---|---|---|
| 0.26 | 87.1 | 87.7 |
| 0.33 | 86.7 | 87.3 |
| 0.39 | 85.4 | 86.9 |
| 0.46 | 84.9 | 86.0 |
| 0.53 | 84.1 | 84.8 |
| 0.59 | 84.1 | 84.3 |
| 0.66 | 83.2 | 83.1 |
| 0.72 | 83.2 | 83.5 |
| 0.79 | 83.4 | 83.5 |
| 0.86 | 81.5 | 82.7 |
| 0.92 | 81.9 | 83.5 |
| 0.99 | 80.6 | 83.1 |
| 1.06 | 80.6 | 82.7 |
| 1.12 | 81.1 | 82.7 |
| 1.19 | 81.1 | 81.8 |
| 1.26 | 80.6 | 81.4 |
| 1.32 | 80.6 | 81.8 |
| 1.39 | 79.8 | 81.8 |

These examples show that under the conditions employed, that is, at high temperatures and high space velocities, the catalysts impregnated with noble metals do not have significantly higher initial activity than the unimpregnated catalysts but their deactivation rate is noticeably lower.

Obviously, various modifications of the invention as hereinbefore set forth may be made without departing from the spirit and scope thereof, and therefore, only such limitations should be made as are indicated in the appended claims.

We claim:

1. A process for the hydrodesulfurization of a petroleum oil fraction having an initial boiling point of at least about 500°F. which comprises contacting said fraction in the presence of added hydrogen under hydrodesulfurization conditions including a temperature between about 750° and 850°F. and a space velocity between about 3 and 10 v/v/hr. with a catalyst comprising an iron group metal, oxide or sulfide and a Group VI metal, oxide or sulfide supported on a base comprising a refractory inorganic oxide support selected from the group consisting of alumina, magnesia and zirconia and mixtures thereof and containing between 0 and 5 weight percent silica, said catalyst also containing from 0.1 to 5 percent noble metal by weight based on the catalyst composite.

2. The process of claim 1 in which the pressure is below 500 psig.

3. The process of claim 1 in which the iron group metal is nickel.

4. The process of claim 1 in which the iron group metal is cobalt.

5. The process of claim 1 in which the Group VI metal is molybdenum.

6. The process of claim 1 in which the Group VI metal is tungsten.

7. The process of claim 1 in which the noble metal is platinum.

8. The process of claim 1 in which the noble metal is rhodium.

9. The process of claim 1 in which the noble metal is iridium.

10. The process of claim 1 in which the space velocity is between 4 and 8.

11. The process of claim 1 in which the noble metal is present in an amount between 0.2 and 2.0 wt. percent.

12. The process of claim 1 in which the refractory inorganic oxide is alumina.

* * * * *